(12) United States Patent
Pape et al.

(10) Patent No.: US 9,971,565 B2
(45) Date of Patent: May 15, 2018

(54) STORAGE, ACCESS, AND MANAGEMENT OF RANDOM NUMBERS GENERATED BY A CENTRAL RANDOM NUMBER GENERATOR AND DISPENSED TO HARDWARE THREADS OF CORES

(71) Applicant: Oracle International Corporation, Redwood Shores, CA (US)

(72) Inventors: John Pape, Cedar Park, TX (US); Mark Luttrell, Cedar Park, TX (US); Paul Jordan, Austin, TX (US); Michael Snyder, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 378 days.

(21) Appl. No.: 14/706,213

(22) Filed: May 7, 2015

(65) Prior Publication Data
US 2016/0328209 A1 Nov. 10, 2016

(51) Int. Cl.
G06F 7/58 (2006.01)

(52) U.S. Cl.
CPC .............. *G06F 7/58* (2013.01); *G06F 7/582* (2013.01)

(58) Field of Classification Search
CPC ................................ G06F 7/58; G06F 7/582
See application file for complete search history.

(56) References Cited

U.S. PATENT DOCUMENTS

| | | | |
|---|---|---|---|
| 5,732,138 A | 3/1998 | Noll et al. | |
| 7,844,758 B1* | 11/2010 | Hughes | G06F 9/52 710/33 |
| 8,190,665 B2 | 5/2012 | Stribaek et al. | |
| 8,566,377 B2 | 10/2013 | Harris et al. | |
| 8,726,041 B2 | 5/2014 | Hatakeyama | |
| 2005/0033940 A1* | 2/2005 | McGrath | G06F 9/30101 712/209 |
| 2008/0250233 A1* | 10/2008 | Marden | G06F 9/3851 712/228 |
| 2008/0282341 A1* | 11/2008 | Hatakeyama | G06F 21/74 726/15 |
| 2008/0291835 A1* | 11/2008 | Cardona | H04L 49/90 370/241 |
| 2011/0022648 A1 | 1/2011 | Harris et al. | |

(Continued)

*Primary Examiner* — Jyoti Mehta
(74) *Attorney, Agent, or Firm* — Meyertons, Hood, Kivlin, Kowert & Goetzel, P.C.

(57) ABSTRACT

Random numbers within a processor may be scarce, especially when multiple hardware threads are consuming them. A local random number buffer can be used by an execution core to better manage allocation and consumption of random numbers. The buffer may operate in a number of modes, and allow any hardware thread to use a random number under some conditions. In other conditions, only certain hardware threads may be allowed to consume a random number. The local random number buffer may have a dynamic pool of entries usable by any hardware thread, as well as reserved entries usable by only particular hardware threads. Further, a user-level instruction is disclosed that can be stored in a wait queue in response to a random number being unavailable, rather than having the instruction's request for a random number simply be denied. The random number buffer may also boost performance and reduce latency.

19 Claims, 12 Drawing Sheets

(56) References Cited

U.S. PATENT DOCUMENTS

| | | | |
|---|---|---|---|
| 2012/0137077 A1* | 5/2012 | Shah | G06F 9/3802 |
| | | | 711/125 |
| 2013/0290675 A1* | 10/2013 | Chou | G06F 9/30043 |
| | | | 712/205 |
| 2013/0297910 A1 | 11/2013 | Smolens et al. | |
| 2014/0188964 A1 | 7/2014 | Weaver, Jr. | |
| 2014/0195576 A1* | 7/2014 | Kaplan | G06F 7/588 |
| | | | 708/250 |
| 2015/0055778 A1* | 2/2015 | Cox | H04L 9/0662 |
| | | | 380/46 |

* cited by examiner

STORAGE, ACCESS, AND MANAGEMENT OF RANDOM NUMBERS GENERATED BY A CENTRAL RANDOM NUMBER GENERATOR AND DISPENSED TO HARDWARE THREADS OF CORES

BACKGROUND

Technical Field

Aspects of this disclosure relate to accessing random numbers for the execution of computer instructions, and to techniques applicable for storing and using random numbers in processor execution cores that support execution of multiple hardware threads.

Description of the Related Art

In computer systems, random numbers may be needed for a variety of tasks, such as performing cryptographic operations, simulations, or statistical sampling. A hardware structure on a processor may thus generate random numbers that can be used by software executing on the processor.

Accessing a hardware-based random number generator (RNG), in some instances, is a relatively slow process that can take hundreds of clock cycles, particularly when the RNG is remote from an execution core. Further, storage space for random numbers may also be limited. Inefficient use of such limited storage space may cause additional latencies, and possibly even thread starvation, when more than one processing thread is attempting to consume randomly generated numbers. Further, it may be difficult to allocate random numbers to different hardware threads so that available resources are not wasted and that forward progress is ensured.

SUMMARY

Various techniques for allocating and managing random numbers within an execution core of a processor are disclosed. Random numbers may be distributed from a central random number generator, and dispatched to a number of different execution cores. Within each execution core, a number of different hardware threads may be competing to use the randomly generated numbers. These randomly generated numbers may be a scare resource, however.

Simply allocating random numbers to requesting hardware threads on a first-come, first-serve basis can result in one hardware thread unfairly consuming a disproportionate amount of the random numbers that are available. In extreme circumstances, a first-come, first-serve policy could even result in starvation of one or more other hardware threads, where those threads cannot progress because another thread is using up all the available random numbers.

Accordingly, managing the allocation and consumption of random numbers by a plurality of different hardware threads may provide a fairer usage of resources, and prevent threads from being starved. The disclosure below includes structures, methods, and policies that describe how random numbers may be stored and managed.

A local random number buffer may store random numbers for a particular execution core. The buffer may allow some of these numbers to be dynamically consumed by any hardware thread, and may also restrict a certain amount of these random numbers so that they can only be used by particular threads. In different operating modes, different amounts of the random numbers that are stored may be part of a dynamic pool (freely available to different threads) or part of a reserved pool (restricted to particular threads). Various conditions may determine how the local random number buffer operates.

Further, a particular instruction for an instruction set architecture (ISA) may result in a random number request being stored in a wait queue, rather than simply having the request be denied. Such an instruction is in contrast to other ISAs, in which a random number request may simply fail when it cannot be immediately serviced (e.g., due to there being no random numbers available for a particular thread).

Note that the teachings of this disclosure, as well as the appended claims, are expressly not limited by the features and embodiments discussed above in this summary.

BRIEF DESCRIPTION OF THE DRAWINGS

The following detailed description makes reference to the accompanying drawings, which are briefly described below.

Figure 1:
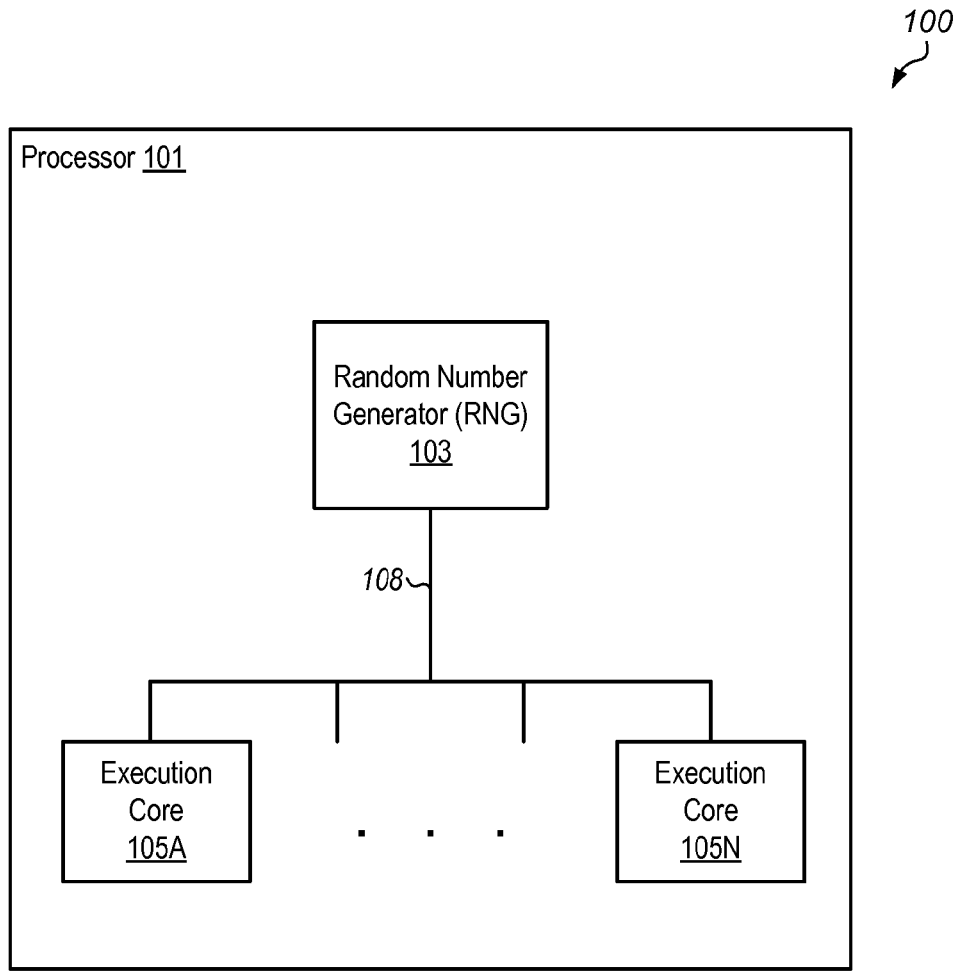
FIG. 1 illustrates an embodiment of a computing system that includes a processor and a central random number generator.

While the disclosure is susceptible to various modifications and alternative forms, specific embodiments are shown by way of example in the drawings. It should be understood, however, that the drawings and detailed description are not intended to limit the disclosure to the particular form(s) illustrated. Instead, various aspects may be combined, omitted, etc. as would occur to a person of skill in the art, resulting in various permutations, modifications, equivalents and alternatives that fall within the spirit and scope of the present disclosure and may or may not be explicitly stated herein, including the claims. Further, the headings used herein are for organizational purposes and are not meant to be used to limit the scope of the description.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

"Comprising" or "Including." These terms are open-ended. As used herein, these terms do not foreclose additional structure or steps. Consider a claim that recites: "a processor comprising a central random number generator (RNG) . . . ." Such a claim does not foreclose the processor from including a second RNG, or other additional components or structures (e.g., interface units, additional circuitry, etc.).

"First," "Second," etc. As used herein, these terms function as labels for nouns that they precede, and do not necessarily imply any type of ordering (e.g., spatial, temporal, logical, etc.). For example, a "first number of entries" of a plurality of storage locations does not necessarily imply that these entries would be, e.g., an initial physically and/or logically contiguous group of entries such as 0 to 31. In other words, "first", "second", etc., are descriptors unless otherwise indicated.

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. Further, "configured to" may include adapting a manufacturing process (e.g., a semiconductor fabrication facility) to fabricate devices (e.g., integrated circuits) that are adapted to implement or perform one or more tasks.

"Processor." This term has its ordinary and accepted meaning in the art, and includes a device that includes one or more execution cores. A processor may refer, without limitation, to a central processing unit (CPU), a co-processor, an arithmetic processing unit, a graphics processing unit, a digital signal processor (DSP), etc.

"Computer" or "Computer System." This term has its ordinary and accepted meaning in the art, and includes one or more computing devices operating together and any software or firmware stored thereon. A computing device includes one or more processors and a memory subsystem. A memory subsystem may store program instructions executable by the one or more processors to perform various tasks.

"Computer-readable Medium." As used herein, this term refers to a non-transitory, tangible medium that is readable by a computer or computer system, and includes magnetic, optical, and solid-state storage media such as hard drives, optical disks, DVDs, volatile or nonvolatile RAM devices, holographic storage, programmable memory, etc. The term "non-transitory" as applied to computer readable media herein is only intended to exclude from claim scope any subject matter that is deemed to be ineligible under 35 U.S.C. § 101, such as transitory (intangible) media (e.g., carrier waves), and is not intended to exclude any subject matter otherwise considered to be statutory.

DETAILED DESCRIPTION OF EMBODIMENTS

Processor Overview

FIG. 1 is a block diagram of a computing system 100 that includes a processor 101, a central random number generator (RNG) 103, and execution cores 105A-105N. (Note that the term central, as used herein with respect to RNG 103, does not imply a positional location relative to other components, but simply indicates that RNG 103 may be used by different execution cores 105A-105N.) Note that in some cases, more than one RNG 103 may be used by execution cores 105A-105N (for example, a subset of execution cores could use one RNG, while another subset uses a different RNG). System 100 may have other components as well (not shown), such as random access memory, read-only memory, input/output (I/O) adapters, user interface adapters, communication adapters, etc. In various embodiments, computing system 100 may be configured as a server system, desktop system, laptop system, or any suitable form factor. In general, any component of processor 101 (such as RNG 103) may be duplicated, used in parallel, etc., as would occur to one with skill in the art.

Processor 101 may be a central processor unit (CPU) in various embodiments, and may implement any suitable instruction set architecture (ISA), such as, e.g., the SPARC™, PowerPC™, or x86 ISAs, or combinations thereof. In the embodiment shown, execution cores 105A-105N are configured to implement one of the aforementioned ISAs. Processor 101 may also include one or more cache memories configured to store instructions and/or data. Processor 101 may include one or more interconnects 108 that couple various components and allow transmission of data, power, and/or signals between these components. One or more bus transceiver units 109 may allow processor 101 to connect to bus 108. Processor 101 is not limited to the description above, however.

Random Number Generator Overview

As shown, RNG 103 is configured to generate random numbers and transmit them to execution cores 105A-105N. Note that the term "random number", as used herein, refers to a number having at least a partially random basis. Thus, the term "random number" does not require that the number be perfectly mathematically random. RNG 103 may use a variety of techniques to generate a random number in different embodiments, such as radio noise sampling, radioactive decay sampling, electrical noise sampling, or any number of techniques known to one of skill in the art. Thus, RNG 103 may produce high quality random numbers based on physical processes, in some instances, that may be suitable for use by computer instructions. Numbers generated by RNG 103 may serve as the basis to seed a pseudo-random function within software, for example, and/or be used for cryptographic purposes.

Random numbers generated by RNG 103, when expressed in digital form, may be any number of bits in various embodiments. In the embodiment shown, RNG 103 is configured to generate 64 bit numbers, though other embodiments may generate random numbers of greater or lesser size. In one instance, RNG 103 may transmit 16 bits of random data at a time, which is then collected at an execution core until 64 bits of random data have been collected (e.g., an entire random number has been received). Other collection and accumulation schemes may also be used as would occur to one with skill in the art.

Random numbers generated by RNG 103 are distributed to execution cores 105A-105N. In one embodiment, a round-robin scheme is used to distribute the numbers. Different ones of cores 105A-105N may request a random number, for example, and RNG 103 will parcel out the numbers to the cores in round-robin order for all cores that are making a request. RNG 103 can also be configured to distribute random numbers in groups of two or more to the cores, if desired. In other embodiments, RNG 103 may distribute random numbers based on any other scheme that ensures a requesting core will eventually get one or more random numbers and thereby avoid starvation (for example, an execution core that has least recently made a random number request may be given first preference).

Local Random Number Buffer within an Execution Core

Figure 2:
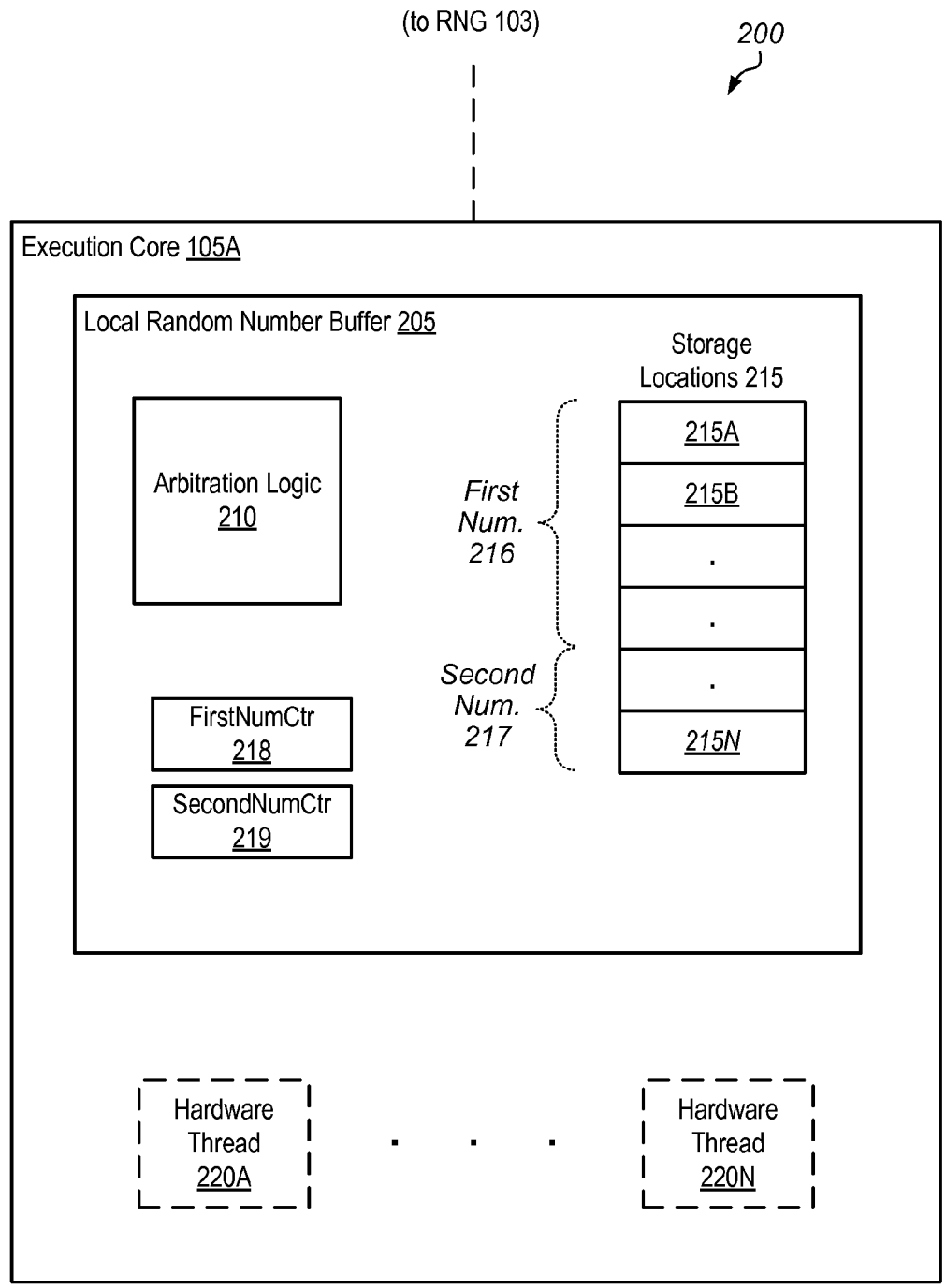
FIG. 2 illustrates an embodiment of a system having an execution core that contains arbitration logic that may perform various operations relative to storing and managing random numbers.

Turning to FIG. 2, a block diagram is shown of a system 200 including one embodiment of execution core 105A. As depicted, execution core 105A includes a local random number buffer 205, which includes arbitration logic 210 and a plurality of storage locations 215A-215N that are configured to store random numbers received from RNG 103.

Execution core 105A (like others of execution cores 105A-105N) is configured to execute instructions for a plurality of hardware threads 220A-220N. Execution core 105A is configured execute instructions for eight hardware threads as shown in FIG. 2, although the number of hardware threads supported may vary by embodiment. Hardware threads 220A-220N may have various corresponding components within execution core 105A and/or processor 101, such as storage structures, control logic, and signal and power transfer mechanisms as will be understood by those with skill in the art. Techniques and structures described with respect to execution core 105A are equally applicable to other ones of execution cores 105A-105N in various embodiments.

Storage locations 215A-215N are configured to store random numbers received from RNG 103. Storage locations 215A-215N may therefore include various entries in which random numbers can be stored. Storage locations 215A-215N may also have additional information associated with them, such as valid bits, counters, and pointers that relate to allocating and consuming random numbers, as further discussed below.

In the embodiment shown, arbitration logic 210 is configured to access storage locations 215 in response to requests for random numbers from a plurality of hardware threads supported by execution core 105A. A request for a random number may correspond to a particular instruction that consumes a random number, for example. Such instructions are discussed in greater detail below relative to FIG. 6.

In one embodiment, arbitration logic 210 is configured to allow a first number of entries 216 to be used by any of the plurality of hardware threads to satisfy a request for a random number. These first number of entries may be referred to as a "dynamic pool" in some instances. Meanwhile, a second number of entries 217 are reserved for use by individual ones of the plurality of hardware threads. These reserved entries may be referred to as a "reserved pool," for example.

Note that in some instances, the first number of entries 216 and the second number of entries 217 are not in fixed storage locations. That is, a particular entry in storage locations 215 is not always dedicated as being part of the first or second number of entries (such as when a FIFO queue is used to manage allocation of random numbers). In other instances, however, all or a part of the first and second number of entries may be pre-designated storage locations that do not change. These aspects are discussed further below.

Current values corresponding to the first number of entries 216 and second number of entries 217 may be maintained by arbitration logic 210 in two different counters, FirstNumCtr 218 and SecondNumCtr 219. For example, as random numbers in storage locations 215 are used and then replenished, FirstNumCtr 218 and SecondNumCtr 219 may be incremented or decremented as appropriate. This aspect is discussed below.

Usage of Storage Buffer as a FIFO Queue

Figure 3A:
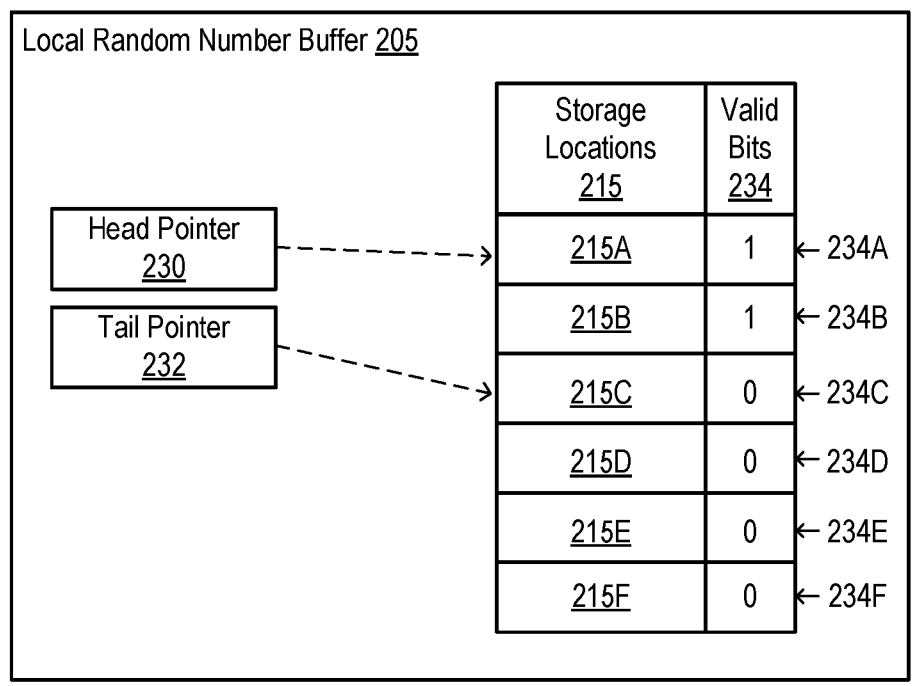
FIGS. 3A-3C illustrate an embodiment of a system in which arbitration logic of a local random number buffer is configured to use storage locations as a first-in first-out (FIFO) queue for random numbers.
Figure 3B:
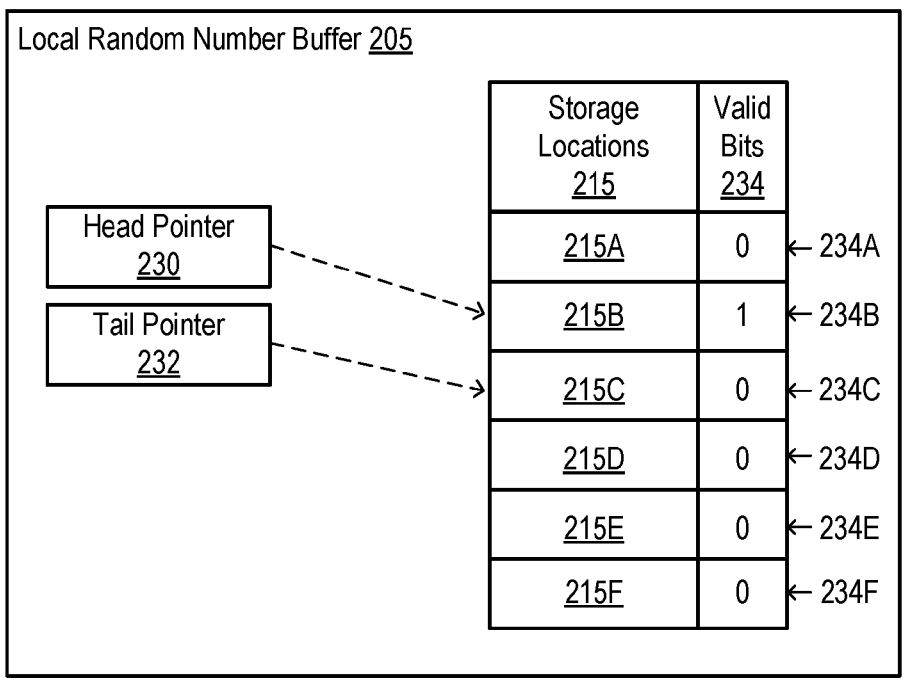
Figure 3C:
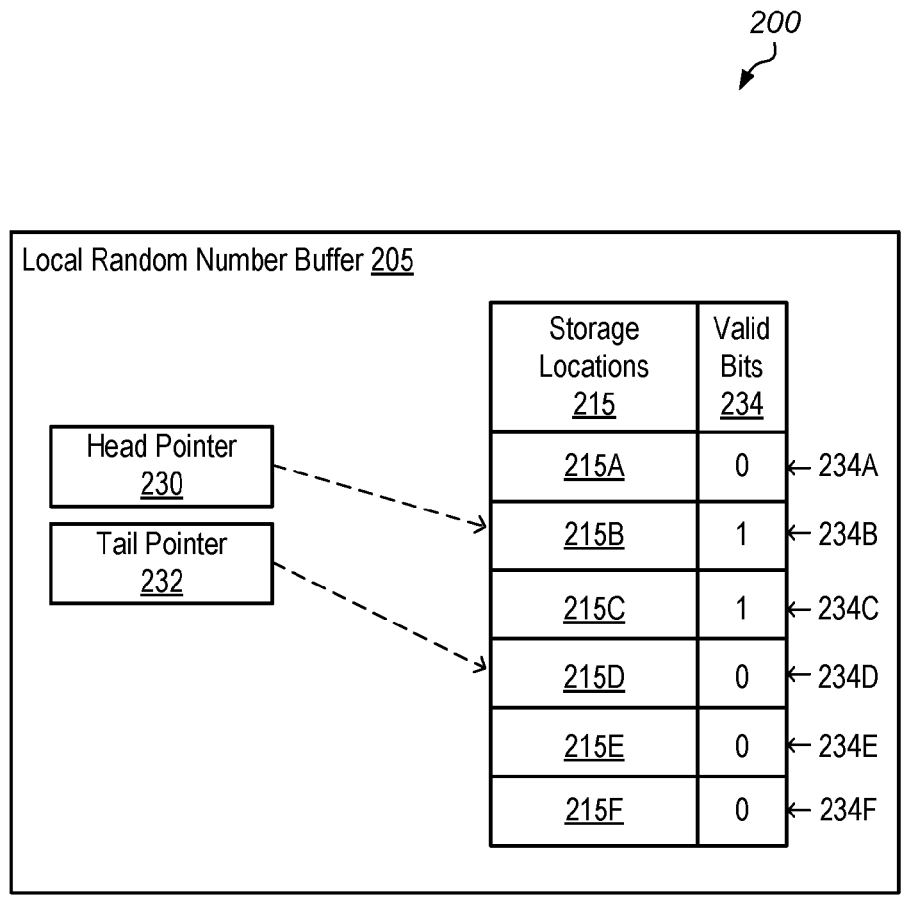

Turning to FIGS. 3A-3C, illustrations of an embodiment of system 200 are shown in which arbitration logic 210 is configured to use storage locations 215 as a first-in first-out (FIFO) queue. In this embodiment, random numbers are dispensed from local random number buffer 205 in the order in which the numbers were received from RNG 103. Head pointer 230 includes a pointer to a front of the FIFO queue, and tail pointer 232 includes a pointer to a tail of the FIFO queue. As random numbers are added to (and removed from) storage locations 215, head pointer 230 and tail pointer 232 are adjusted as needed.

In this embodiment, head pointer 230 indicates which of storage locations 215 is the oldest (least recently received) random number, while tail pointer 232 indicates which of storage locations 215 is the next empty entry to which a random number received from RNG 103 will be stored. A valid bit 234 (e.g., 234A, 234B, 234C, 234D, 234E, or 234F shown in FIGS. 3A-C) may indicate whether a particular entry in storage locations 215 is valid (e.g., currently has a valid random number) or is invalid (e.g., the entry is empty and available to store a new random number from RNG 103). Note that in at least one embodiment, however, it is not necessary to explicitly maintain valid bits for storage locations 215. For example, valid bits may be derived from head pointer 230 and tail pointer 232, or by the sum of FirstNumCtr 218 and SecondNumCtr 219. Thus, there may be various embodiments in which valid bits are derived.

In this particular example, head pointer 230 corresponds to storage location 215A, while tail pointer 232 corresponds to storage location 215C. Thus, as shown, there are only two valid random numbers in storage locations 215 in FIG. 3A. As random numbers are added, tail pointer 232 is incremented to the next one of storage locations 215 (e.g., to 215C, 215D, 215E, 215F, etc.). When a random number is consumed, head pointer 230 is also incremented. Head pointer 230 and 232 may be cycled back in a circular fashion upon reaching the end of storage locations 215. And if tail pointer 232 reaches the same storage location as head pointer 230 in this example, storage locations 215 are full, and no more random numbers can be stored in local random number buffer 205.

Turning to FIG. 3B, a continuation of the example of FIG. 3A is shown. In this figure, the random number in storage location 215A has been used, and the entry has been invalidated (freed), as indicated by valid bit 234A. Head pointer 230 has been incremented to storage location 215B. Continuing this example, FIG. 3C shows storage locations 215 after a new random number has been received from RNG 103. Thus, tail pointer 232 has been incremented to 215D, while valid bit 234C has been changed to indicate that storage location 215C now has a valid random number stored. In this FIFO example, storage locations 215B and 215C will be the next locations from which random numbers are dispensed by arbitration logic 210, while storage locations 215D, 215E, 215F, and 215A are the next sequential locations into which new random numbers received from RNG 103 will be stored.

Thus, in the embodiment of FIGS. 3A-3C, random numbers are dispensed from a storage location pointed to by head pointer 230 in which arbitration logic 210 uses storage locations 215 as a FIFO queue. Note that other types of implementations may be used to achieve the effect of having storage locations 215 function as a FIFO queue, as will be understood to one of skill in the art. In various embodiments, however, these implementations will allow arbitration logic 210 to determine which entry in storage locations 215 is oldest (least recently received), and to which available entry a next received random number will be stored.

Usage of storage locations is explicitly not limited to FIFO embodiments, however. Any number of schemes may be used in various embodiments. A last-in, first-out (LIFO) scheme could easily be used instead of FIFO, for example. More generally, a pool (or "bucket") of random numbers stored in storage locations 215 could have the numbers be dispensed in any order (not just FIFO or LIFO), as long as that when storage locations 215 are empty, no random number is dispensed, and that each random number written to local random number buffer 205 can be dispensed only once.

Example of Using Dynamic and Reserved Entries for Multiple Threads

Turning to FIGS. 4A-4D, illustrations of another embodiment of system 200 are shown in which counters are adjusted as random numbers are depleted from and added to storage locations 215. In this example, the counters relate to a pool of dynamically allocable entries, and a pool of reserved entries that can only be used by particular threads. Storage locations 215 function as a FIFO queue in this embodiment, although certain numbers of entries are reserved for usage by particular threads. Thus, no single hardware thread is allowed to completely use all entries in local random number buffer 205, as this may impede progress of other threads.

Note that in the embodiments of FIGS. 4A-4D, dynamic pool entries are consumed first, followed by reserved pool entries. Analogously, in these embodiments, reserved pool entries are repopulated with random numbers before dynamic pool entries are repopulated. However, different allocation schemes may also be used for storage locations 215. More specifically, in other embodiments, reserved entries may be consumed before dynamic entries (for example, it may be desirable to consume special purpose resources before general purpose resources). Thus, in one embodiment, a thread would first consume its reserved entries from storage locations 215 before consuming entries that are dynamically available to all threads.

Figure 4A:
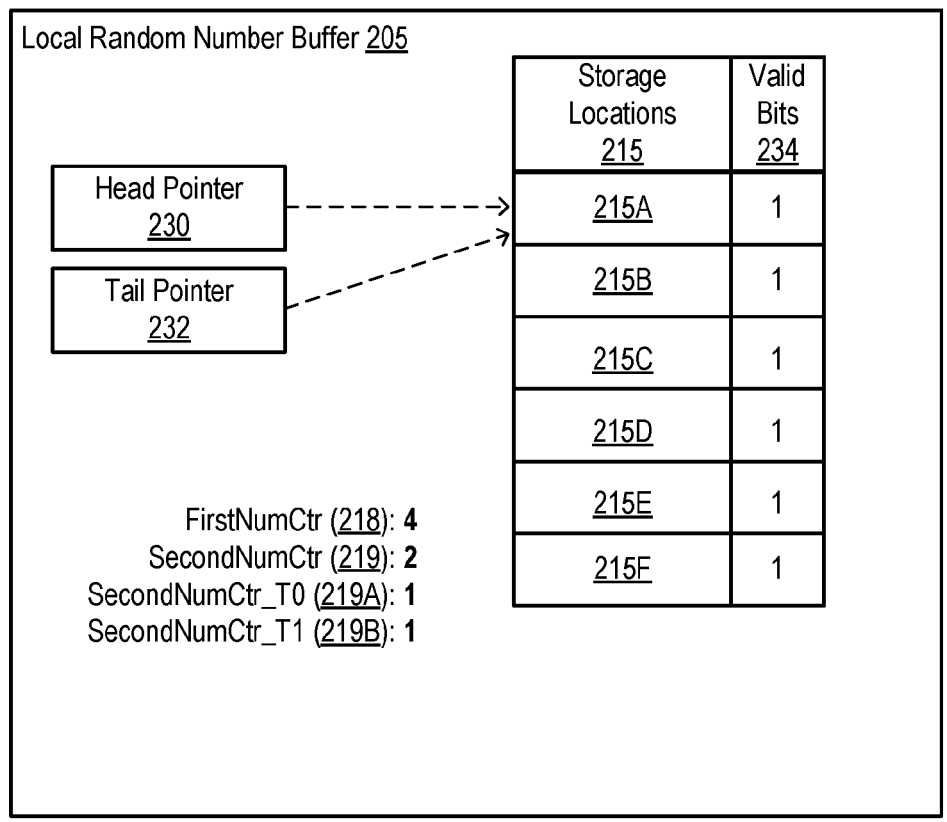
FIGS. 4A-4D illustrate an embodiment of a system in which various counters are adjusted as random numbers are depleted and added from storage locations in a local random number buffer.

In FIG. 4A, storage locations 215A-215F are initially full with valid random numbers, and there are two active threads T0 and T1. There are 4 dynamically allocable entries that can be used by any of threads T0 and T1, as indicated by FirstNumCtr 218 (thus, the dynamic pool is of size 4). There are also 2 reserved entries, as indicated by SecondNumCtr 219 (and thus, the reserved pool is of size 2). Specific counters SecondNumCtr_T0 (219A) and SecondNumCtr_T1 (219B) further indicate that T0 and T1 each have one specifically reserved entry that cannot be used by any other thread.

Figure 4B:
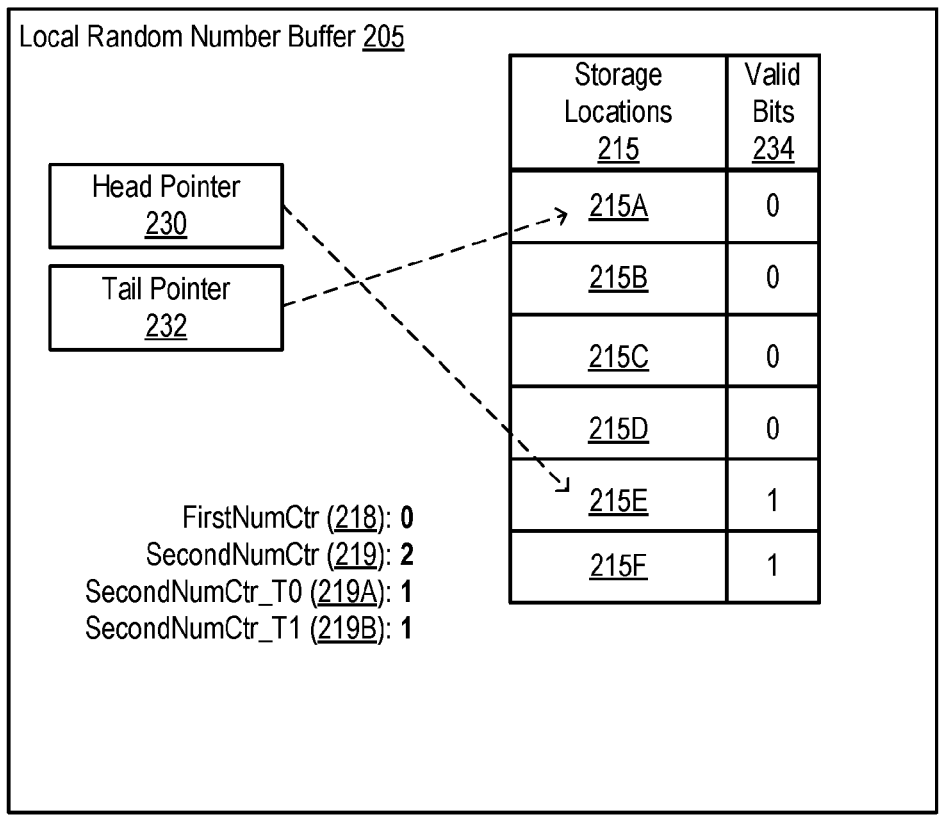

Turning to FIG. 4B, all 4 dynamically allocable storage locations have now been consumed, as indicated by valid bits 234 for storage locations 215A-215D having all changed from one to zero (again, note that in some embodiments, entry validity may be derived rather than explicitly indicated by valid bits 234). Note that in various embodiments, dynamically allocable entries are always consumed before any dedicated (reserved) entries are consumed. As shown in FIG. 4B, while the dynamic pool is now empty, each of threads T0 and T1 still has a reserved entry available to service a random number request.

Figure 4C:
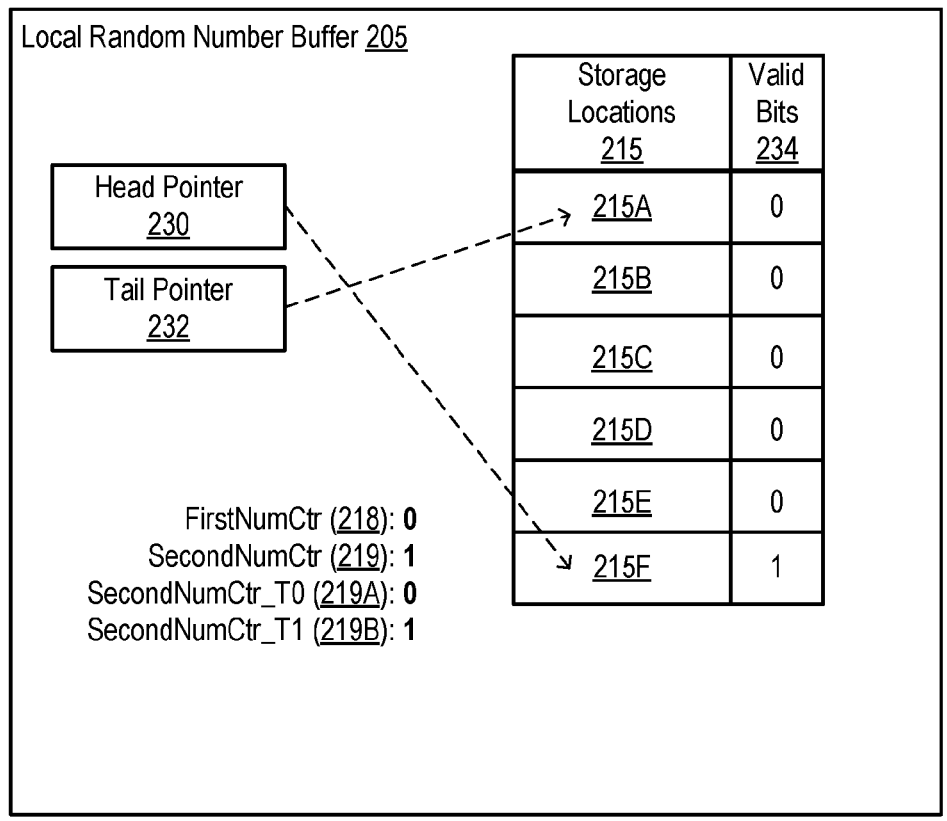

Turning to FIG. 4C, thread T0 has now used an additional random number from storage locations 215 (and no new entries have been replenished). Accordingly, there is only one random number remaining for usage. However, the remaining valid storage location 215F can only be accessed by thread T1 in this example, because T0 has used its only reserved entry already (as indicated by SecondNumCtr_T0 having been decremented to zero, while SecondNumCtr_T1 still has a value of one).

Thus, when local random number buffer 205 appears as shown in FIG. 4C, a random number request for thread T1 will be serviced promptly, but a random number request for thread T0 will have to wait until an additional random number is received from RNG 103. Actions relating to tracking different amounts of random numbers that are stored by storage locations 215, such as those described above (e.g., incrementing and decrementing various counters) may be performed by tracking logic that, in various embodiments, is part of arbitration logic 210.

Replenishment of Random Numbers in Local Random Number Buffer

After entries have been depleted, storage locations 215 may be replenished with new random numbers received from RNG 103 in a variety of ways. In one embodiment, reserved entries are always preferentially replenished before dynamically allocable entries. This preferential replacement policy may help better ensure forward progress of all threads when there are few random numbers available.

Figure 4D:
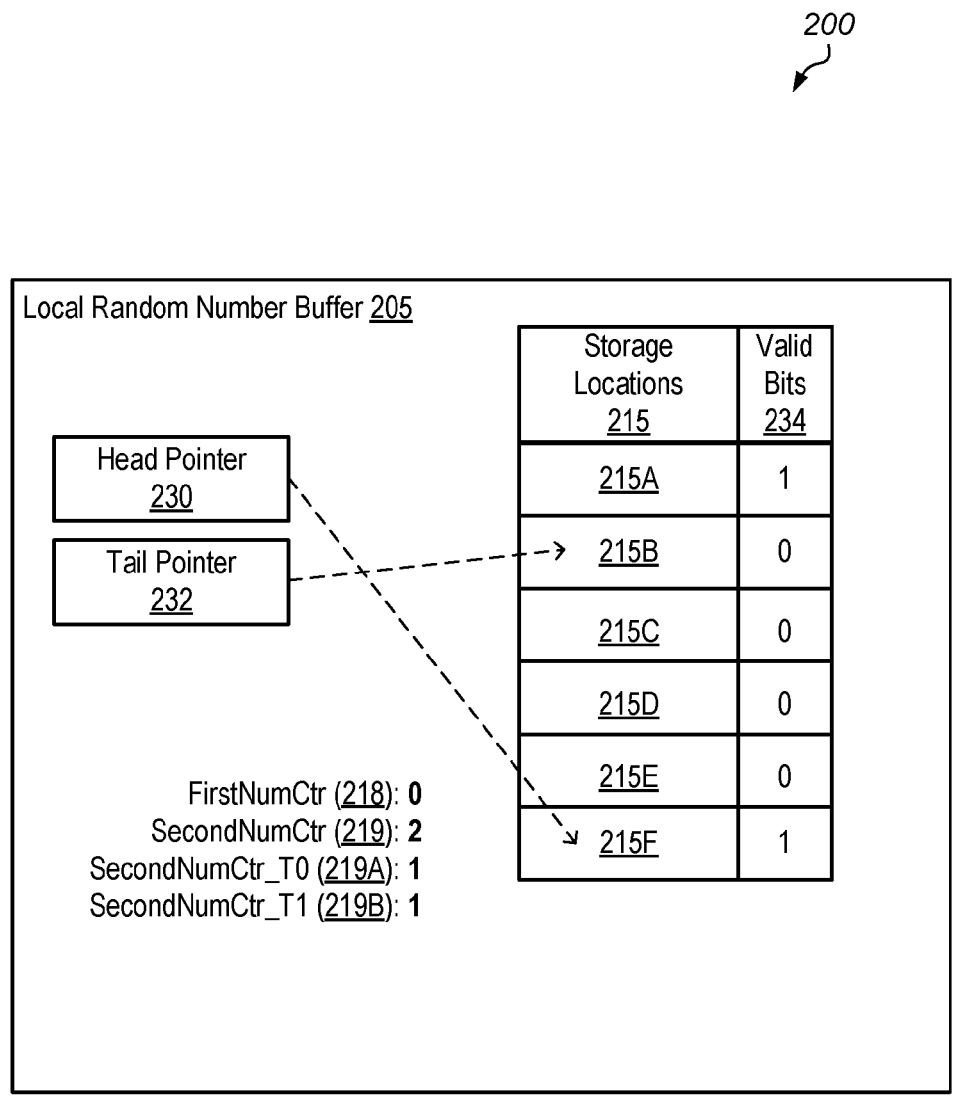

Turning to FIG. 4D, an additional random number has been received by local random number buffer 205. This new number is stored in location 215A, and SecondNumCtr 219 and SecondNumCtr_T0 219A are both incremented. Thread T0 now, once again, has an available reserved entry. Further received random numbers (assuming none are used, and that the reserved entries are full) will result in FirstNumCtr 218 being incremented until the entire buffer is full again. Also, note that in some cases, SecondNumCtr 219 may be omitted entirely, as it is sufficient to simply maintain reserve counters for each particular thread, e.g., 219A and 219B, and it is not necessary to maintain a reserve counter for the total number of reserved entries that are currently available (since this value can be derived).

Replenishment of dynamic (non-reserved) entries is performed, in one embodiment, by simply adding entries to the dynamic pool once the reserved entries for all (active) threads are full. If the dynamic pool is empty (e.g., FirstNumCtr 218 is zero) and the reserved entries are less than full, replenishment of the reserved entries can be performed in round robin fashion. In this scheme, a first thread having less than its full number of reserved entries gets a group of one or more newly received random numbers, then a second thread having less than its full number of reserved entries will get the next group of one or more random numbers received from RNG 103. In instances in which multiple entries are reserved for each hardware thread, the round-robin replenishment of random numbers may be weighted. E.g., if thread T0 has 0/4 reserved entries full, and thread T1 has 2/4 reserved entries full, entries for thread T0 may receive the first two random numbers before entries for thread T1 receive any new random numbers (because after thread T0 gets 2 new entries, both threads would be at the same level, 2/4). In other words, threads with relatively fewer quantities of reserved entries may have newly generated random numbers over-allocated to them until they "catch up" with threads having relatively greater quantities of reserved entries, in some embodiments. Note that arbitration schemes other than round robin or those described above may be used to fill reserved entries in storage locations 215. For example, any arbitration scheme can be used that guarantees that the reserved pools of active threads are all eventually provided with new random numbers.

Thus, in accordance with the above description of FIGS. 4A-4D, counters 218, 219, and 219A and 219B may operate as follows in one embodiment. When thread T0 requests a random number, arbitration logic 210 checks to see if FirstNumCtr 218 is non-zero (e.g., there is at least one entry in the dynamic pool). If FirstNumCtr 218 is non-zero, a random number is provided from storage locations 215 and FirstNumCtr 218 is decremented. If FirstNumCtr 218 is zero, however (e.g., the dynamic pool is empty), then arbitration logic 210 checks SecondNumCtr 219A (corresponding to thread T0) to see if that counter is non-zero. If SecondNumCtr 219A is non-zero, then a random number is again provided from storage locations 215 and SecondNumCtr 219A is decremented (reducing the number of reserved entries for thread T1 by one). If both FirstNumCtr 218 and SecondNumCtr 219A are zero, however, this indicates that the dynamic pool is empty as well as the reserved pool for thread T0. In this case, the random number request cannot be immediately serviced, and may be placed in a wait queue (further described below). Similar operations may be performed using SecondNumCtr 219B for thread T1 (or another similar SecondNumCtr for another thread).

Statically Allocated Random Number Entries

Figure 5:
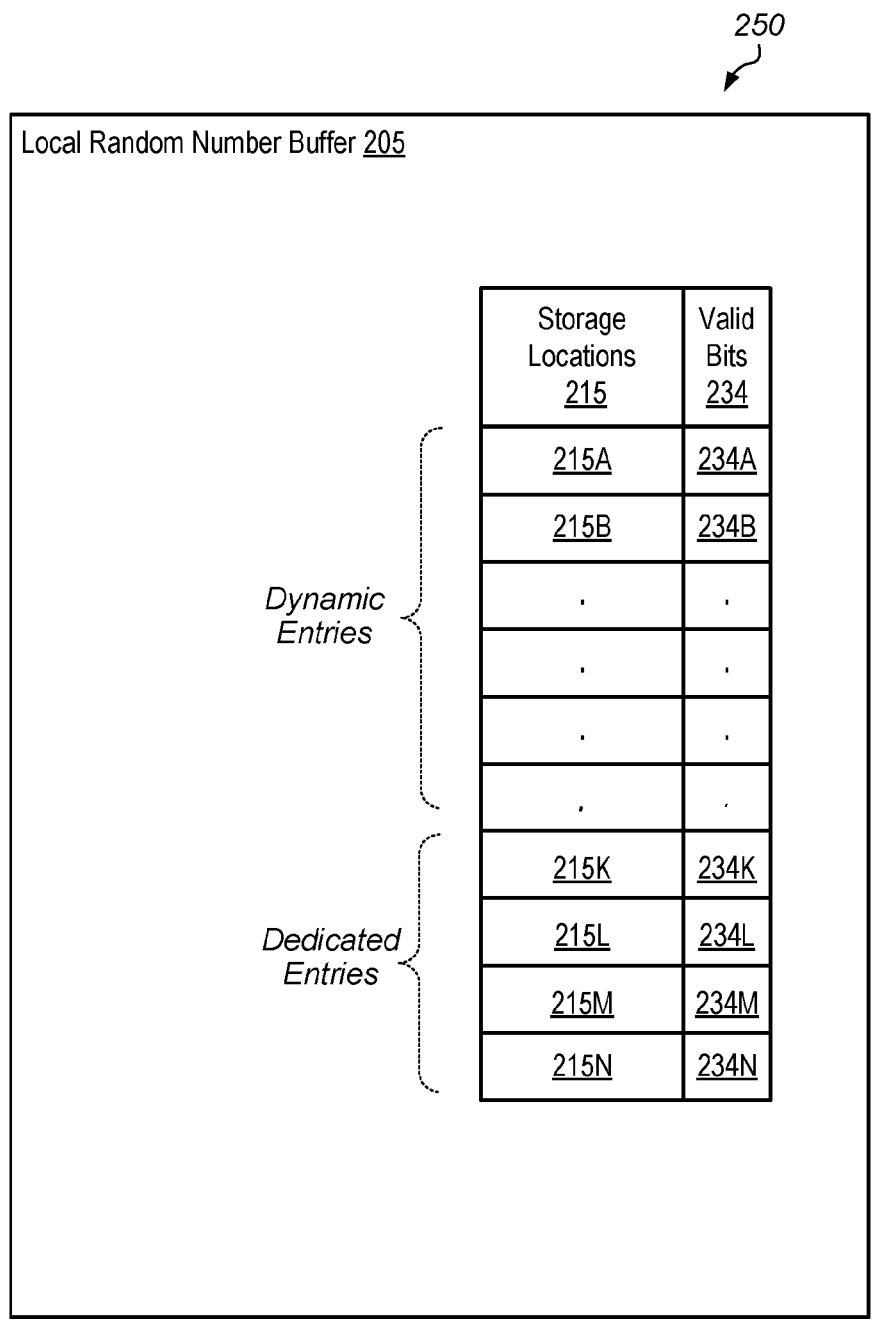
FIG. 5 illustrates an embodiment of a system in which particular storage locations are reserved (i.e., dedicated) for use by particular threads, and in which the storage locations do not function purely as a FIFO queue.

Turning briefly to FIG. 5, a block diagram is shown of a system 250 in which specific storage locations are used for reserved entries, and in which local random number buffer does not necessarily operate as a FIFO queue. As shown in FIG. 5, system 250 includes a local random number buffer 205 having storage locations 215A-N and corresponding valid bits 234A-N. In this embodiment, specific ones of storage locations 215 are reserved for the use of particular threads. Accordingly, as shown in FIG. 5, storage locations 215K, 215L, 215M, and 215N are reserved for use by particular threads (while various storage locations including 215A, 215B, etc., are dynamic pool entries that can be used by multiple threads). Thus, storage location 215K may be reserved for exclusive use by thread T0, while storage location 215M is reserved for exclusive use by thread T2.

Note that in this embodiment, dynamic entries such as those stored in locations 215A and 215B may still be preferentially consumed before using entries in reserved locations 215K-215N. Techniques for allocating and consuming random number entries, such as described above, may be adapted for use in this embodiment.

Figure 6:
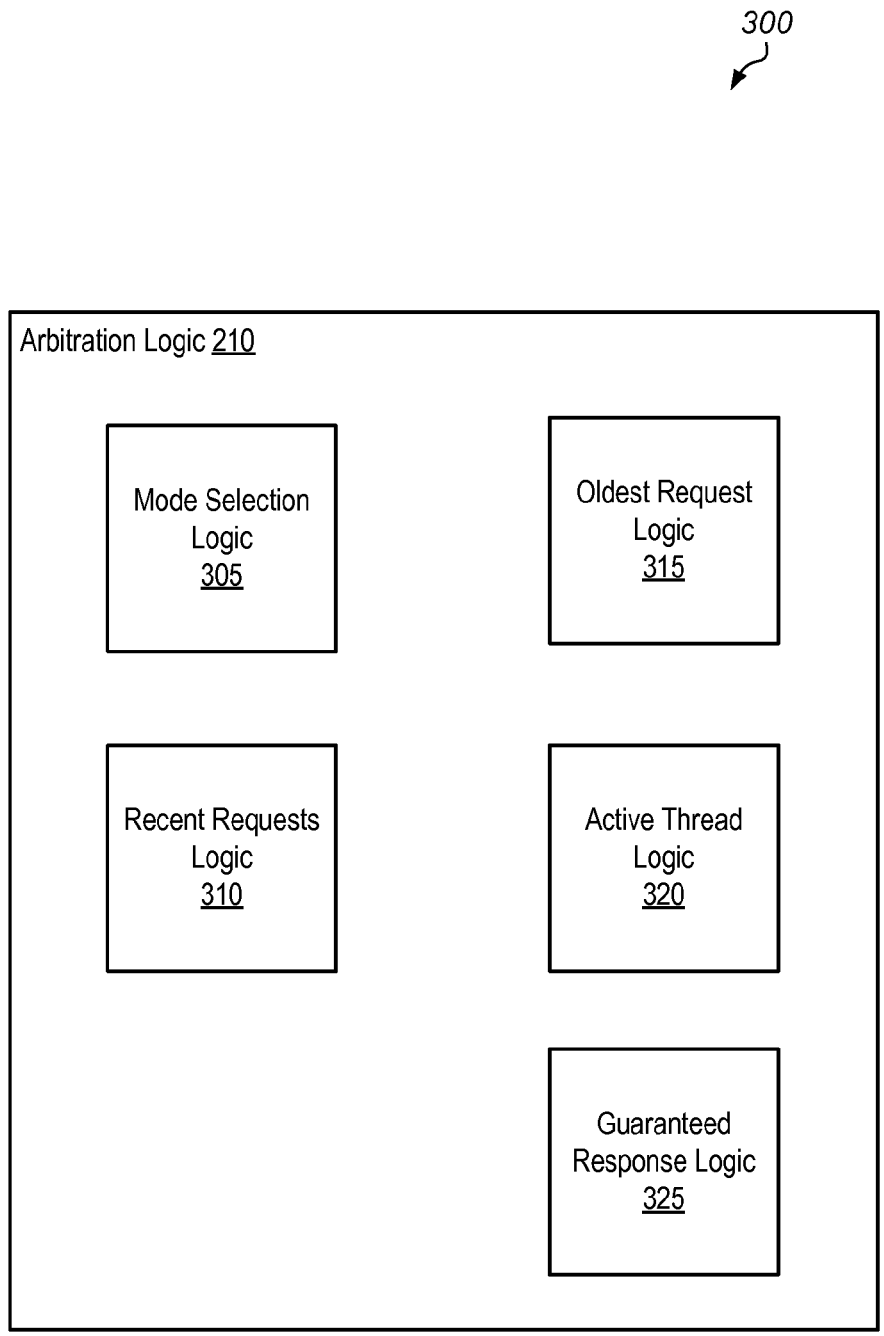
FIG. 6 illustrates an example of a system in which arbitration logic includes various additional features related to servicing random number requests, including features relating to different random number allocation modes, tracking recency of random number requests by hardware threads, whether a request is an oldest request, making allocation adjustments based on whether one or more threads are active or inactive, and/or making additional efforts to service a random number request by waiting (rather than denying the request when a number cannot be immediately provided), for example.

Turning to FIG. 6, a block diagram is shown of a system 300 in which arbitration logic 210 includes certain features related to servicing random number requests from a plurality of hardware threads. In this embodiment, arbitration logic 210 may control various aspects of local random number buffer 205 (and/or other hardware) to allow multiple different allocation modes for random number entries, and to track whether a hardware thread has made a recent request for a random number within a particular time period (e.g., a certain number of instructions). Arbitration logic 210 may also determine whether to service a particular random number request based on whether the request is the oldest request for a thread, and may make adjustments to the allocation of random number storage locations based on whether a thread is active. As shown, arbitration logic 210 includes mode selection logic 305, recent requests logic 310, oldest request logic 315, active thread logic 320, and guaranteed request logic 325, features of which are further described below.

Multiple Modes for Allocating Random Number Storage Locations

Multiple different operating modes may be used by mode selection logic 305 to manage the allocation and usage of random numbers. These various modes, which will be described below, may be preselected and/or dynamically selected. For example, one or more of the modes may be operated in based on a BIOS setting, or based on a particular instruction and/or interrupt (e.g., based on software). In some instances, transitions between different allocation modes may also occur based on certain conditions. Thus, mode selection logic 305 may operate in a first mode, but then transition to operating in a different mode based on one or more conditions occurring.

Modes that are used by mode selection logic 305 may affect the size of a dynamic pool of random number entries in storage locations 215, and the size of a reserved number of entries in storage locations 215. Further, certain operating modes supported by mode selection logic 305 may restrict consumption of random numbers from storage locations 215 based on certain factors such as whether a request is an oldest one for a thread.

Adjustment for Thread Activity and Inactivity

Whether a particular hardware thread is active affects the allocation of resources within local random number buffer 205 in various modes. Thus, active thread logic 320 may affect how storage locations 215 are allocated and consumed by tracking whether particular hardware threads are active.

In a machine that supports eight threads, for example, more than one thread will frequently be inactive. Active thread logic 320 therefore may interface with various parts of arbitration logic 210 to cause adjustments to be made accordingly. More specifically, a thread that is inactive may not have any dedicated entries in storage locations 215 allocated to it (that is, an inactive thread may have no reserved entries). Thus in various embodiments, upon active thread logic 320 determining that a thread has become active, it causes arbitration logic 210 to reserve appropriate resources (e.g., storage locations) for the newly active thread according to whatever mode selection logic 305 is using. Likewise, if active thread logic 320 determines that a thread is no longer active, it may cause arbitration logic 210 to deallocate one or more of storage locations 215 (e.g., by decrementing and/or incrementing counters related to the dynamic pool size and reserved entries, such as 218, 219, 219A, or 219B, or otherwise noting that a counter for a particular thread should not be incremented). Further, in some instances, a thread becoming active or inactive can also cause mode selection logic 305 to change its operating mode. Note that references to a "thread" (i.e., hardware thread) throughout this disclosure may therefore refer to an active thread unless otherwise indicated.

"56/8" Allocation Mode

Returning to the discussion of different operating modes supported by mode selection logic 305, a first mode simply reserves one entry of storage locations 215 for each (active) hardware thread. This mode may be referred to as "56/8" in some embodiments in which 8 threads are supported, and there are 64 entries in storage locations 215 (indicating that in these instances, the dynamic pool size will be 56 entries when each of the 8 threads has one single entry reserved for its exclusive use). Of course, if a lesser number of threads are active, the dynamic pool may be larger. Thus, in one embodiment, when only 2 threads are active, the dynamic pool will be 62 entries and there will be 2 reserved entries when mode selection 305 is operating in a "56/8" mode.

"32/32" Allocation Mode

A second mode supported by mode selection logic 305 operates similarly to the first mode, but reserves more than one entry of storage locations 215 for each (active) hardware thread. For example, instead of simply reserving one entry for each thread, the second mode may reserve four entries (or any other number of entries, in various embodiments). Thus, this second mode may be referred to as "32/32" in some embodiments in which 8 threads are supported, as each active thread gets 4 reserved entries, and there are 64 entries in storage locations 215. Accordingly, in this mode, when all 8 threads are active, the dynamic pool will be 32 entries, and there will be 32 reserved entries.

Recent Request Mode(s)

In a third mode supported by mode selection logic 305, the number of dedicated entries for each active hardware thread may vary depending on whether that thread has made a random number request within a previous period of time (e.g., a certain number of clock cycles, or a certain number of instructions). Recent requests logic 310 may track or otherwise be able to ascertain, for example, whether a particular thread has made a request within a last one million, two million, or some other number of clock cycles.

In one particular embodiment, recent requests logic 310 maintains a two-bit counter for each thread, the least-significant bit (LSB) of which gets set if that thread makes a random number request. After N clock cycles, the two-bit counter shifts left, setting the LSB back to 0. If either bit in the two bit counter is 1, the hardware thread will be considered to have made a request within the last 2N clock cycles (where N may be any positive integer). Of course, many different implementations are possible, and tracking whether a thread has made a recent random number request is not limited to the example above.

Note that the third mode described above (which may be referred to as a "dynamic" mode) is usable in combination with the second mode in one embodiment. In this example, an active thread might be initially allocated only one reserved entry in storage locations 215 by arbitration logic 210. However, after recent requests logic 310 determines that the thread has made a random number request within a particular previous time period (e.g., number of clock cycles), that thread may get an increased number of reserved entries in storage locations 215. The thread may be bumped up from one entry to two, four, or any other number of entries, for example. If the same thread fails to make another random number request within another number of clock cycles, however, its additional entries may be released back into the dynamic pool for use by any of the threads, leaving that thread with only one reserved entry, or some lesser number of entries. (And again, if it is determined by active thread logic 320 that a thread has gone inactive, all of its reserved entries in storage locations 215 may be released into the dynamic pool.)

In a further embodiment, dynamic dedicated pool sizing may be used to adjust the number of entries in storage locations 215 that are reserved by a particular thread. For example, whenever a thread makes a random number request that can't be satisfied, the size of its dedicated (reserved) pool could be doubled, up to some predetermined maximum size. Once the thread has gone N cycles without its dedicated pool falling below some predetermined threshold (or without making a random number request, in some instances), however, the dedicated pool for that thread could be halved (repeatedly, if needed), or simply reset to a predetermined smaller size (e.g. one or four entries). Also, note that generally, the number of N cycles used in techniques described above can either be preset, or could be configurable during operation.

Modes Affected by Whether a Random Number Request is the Oldest for a Thread

In some modes implemented by mode selection logic 305, whether or not a thread's random number request will be serviced at a particular time depends on whether that request is the oldest random number request for that thread. Speculative instructions may cause random numbers to be depleted from storage locations 215 much faster than those numbers can be replenished from RNG 103 in some situations, for example. Thus, simply allowing every request to be serviced at any time may result in a dearth of random numbers in local random number buffer 205.

To alleviate this issue, one or more restrictions may be placed on the servicing of random number requests by arbitration logic 210. These restrictions may involve allowing certain requests to be serviced only when they are the oldest request (e.g., earliest in program execution order) for a thread. Such restrictions may also be used in various combinations with aspects of other modes described above. Oldest request logic 315 may be used to determine if an outstanding request for a random number is the oldest request for a particular thread (by examining instruction order or using other techniques as would be known by those with skill in the art). In one embodiment, determining that a random number request is oldest includes determining that an instruction corresponding to the random number request is next-to-commit. Mode selection logic 305 may therefore receive information indicating whether a random number request is oldest from oldest request logic 315 in some embodiments.

Accordingly, in one mode supported by mode selection logic 305, the dynamic pool is sized at 56 (or more) entries, while the reserved pool is sized at 8 entries (or less) depending on the number of active threads, for example. In this embodiment, the dynamic entries can be consumed by any request (speculative or not). However, each thread will get a single reserved entry in storage locations 215 that can only be consumed by the oldest request for that thread. Thus, while entries can be used freely when many random numbers are available, consumption is more carefully regulated when the dynamic pool has already been depleted.

Similar techniques are also applicable when a thread has more than one dedicated entry in storage locations 215, such as in the second mode (aka "32/32") described above. In these embodiments, part or all of the multiple reserved entries for a thread may be restricted for oldest-only random number requests. For example, if a thread has four reserved entries in storage locations 215, the first three of those four entries might be consumed by any random number request. However, the last remaining entry may be restricted to only the oldest random number request for that thread. Note that in other variants, multiple entries may be restricted as to whether a request will be served, e.g., a thread may have two or more reserved entries in storage locations 215 that require an oldest request in order to be serviced. In accordance with the above, in one embodiment, the last reserved entry in storage locations 215 for a thread is oldest-only to ensure forward progress (and other entries in the dynamic and/or reserved pool may optionally be configured to require a request be oldest-only).

Efforts to Guarantee Success for Random Number Request

In various embodiments, local random number buffer 205 may make efforts to guarantee the success of every random number request. Guaranteed request logic 325 performs these functions in the embodiment of FIG. 6.

Sometimes a random number request cannot be immediately serviced by arbitration logic 210. If the dynamic pool of storage locations 215 is empty, and a thread has no reserved entries available, it may not be possible to service the request at the time it is received, for example. Likewise, a request that is not the oldest random number request for a thread may also not be serviced immediately under some circumstances (see above).

When a random number request cannot be immediately serviced, guaranteed request logic 325 may use one or more mechanisms to suspend access to storage locations 215. For example, guaranteed request logic 325 may store the request in a wait queue until such time that a random number is available for the request. Availability may occur when a new number is received from RNG 103, or when the request that is stored in the wait queue becomes the oldest request for its corresponding thread, for example. When guaranteed request logic 325 detects that a random number in storage locations 215 has become available, the request may be serviced and removed from the wait queue. The request may also be removed from the wait queue if it is flushed (e.g., the request was part of a speculatively executed instruction that was later discarded). The wait queue used by guaranteed request logic 325 may store requests for any of the threads supported by execution core 105A, and may be managed using various techniques that would occur to one of skill in the art.

Thus, arbitration logic 210 is configured to, upon determining there are no available random numbers in storage locations 215, wait until a later time to provide a random number in response to a request, rather than denying the request, in at least one embodiment. In some instances, a delayed request for a random number is therefore guaranteed to receive a random number eventually (unless the request is flushed, and/or an exception or interrupt occurs).

Instruction Set Architecture and Guaranteed Response for Random Number Request

An instruction set architecture (ISA) may include one or more instructions that request a random number such as those produced by RNG 103. In some ISAs, however, an instruction that requests a random number may simply fail when a random number cannot be obtained. That is, in some ISAs, an instruction is not guaranteed to return a random number for a given request.

In contrast, the present specification discloses an ISA in which one or more instructions that request a random number are serviced on a delay in certain conditions, rather than simply having the request denied. Guaranteed request logic 325, as described above for example, may allow such an instruction to be implemented by an ISA supported by execution core 105A.

In one embodiment, two types of instructions that relate to random number requests are supported. Both of these instructions (RDENTROPY_1 and RDENTROPY_2), attempt to acquire a random number from storage locations 215. The result of RDENTROPY_1 will be delayed, however, in the event the request cannot be fulfilled (for example, until additional random numbers are received from RNG 103 or until the instruction becomes the oldest random number request for its thread). In contrast, RDENTROPY_2 may return a random number from storage locations 215 more immediately, even if an instance of that instruction is not the oldest request for its thread (software may request such behavior, for example). In the event that there are no random numbers for a given thread in storage locations 215 (not even a last entry restricted for use by an oldest request), however, RDENTROPY_2 could still be delayed for a time until a new random number becomes available. Thus, RDENTROPY_2 may override requirements that an instruction correspond to an oldest random number request, in some situations.

An instruction such as RDENTROPY_1 or RDENTROPY_2 is a user-level instruction in some embodiments. For example, an ISA may have instructions that correspond to different privilege levels (user, supervisor, etc.). Allowing a random number request to be implemented as part of a user-level instruction can avoid bottlenecks and slowdowns when compared to implementations in which a higher privilege level is required to get a random number. (In such embodiments, for example, user code might have to first make a request to a more privileged hypervisor that can procure a random number, thus further slowing down response time and creating additional overhead.) Thus, in at least one embodiment, an ISA includes a user-level instruction that requires a random number produced by RNG 103.

Figure 7:
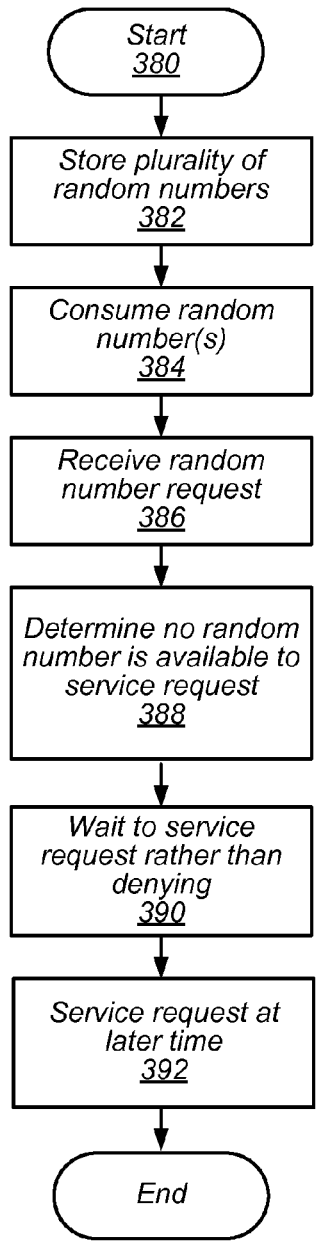
FIG. 7 illustrates a flowchart of a method that relates to delaying a request for a random number (e.g., when the request cannot be immediately satisfied) rather than denying the request.

Turning now to FIG. 7, a flowchart is shown of a method 380 that relates to delaying a request for a random number rather than denying the request. In one embodiment, the operations of method 380 may be performed by local random number buffer 205 (including but not limited to the use of various components and techniques described above). Further, as will be understood, various operations described below relative to this method can be performed in a different order, have portions omitted, etc., as is consistent with this disclosure and as would occur to one of skill in the art.

In operation 382, local random number buffer 205 stores a plurality of random numbers that have been received from RNG 103. These numbers are stored in storage locations 215, in one embodiment. Thus, following operation 382, local random number buffer has at least two valid entries (if not more).

In operation 384, one or more of the random numbers in storage locations 215 are consumed by one or more hardware threads (at least partially emptying local random number buffer 205). In operation 386, a request for a random number is received at local random number buffer for a particular hardware thread. Following this request, in operation 388, local random number buffer 205 (e.g., using arbitration logic 210) determines that there is no random number available to service the request for the particular hardware thread. Thus, operation 388 may include a determination that the dynamic pool of entries for storage locations 215 is empty, and that the reserved pool of entries for the particular hardware thread is also empty. Operation 388 may also include a determination that the reserved pool of entries for the particular hardware thread is not empty, but that the request does not satisfy a condition for receiving a random number from storage locations 215 (e.g., the request is not the oldest request for that particular hardware thread).

In operation 390, local random number buffer 205 waits to service the request for the particular hardware thread, rather than denying the request. (In contrast, in some ISAs, for example, a failed/denied request may simply return with no valid result or with an exception). Waiting to service the request may include guaranteed request logic 325 putting the request into a wait queue as described above. The wait queue may be checked periodically (e.g., when a new number is received from RNG 103, or on some other basis) to determine if a number is now available to service the request. Then, in operation 392, the request is serviced at a later time by retrieving a random number from storage locations 215.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
  a plurality of execution cores, each of which is configured to execute a respective plurality of hardware threads; and
  a central random number generator (RNG) configured to provide random numbers to the plurality of execution cores;
  wherein each of the plurality of execution cores comprises:
    a local random number buffer that includes a plurality of storage locations configured to store random numbers received from the RNG;
    arbitration circuitry configured to access the plurality of storage locations in response to requests for random numbers from the respective plurality of hardware threads for that execution core;
    wherein, for that execution core, the arbitration circuitry is configured to allow a first number of entries in the plurality of storage locations for that execution core to be used by any of the respective plurality of hardware threads for that execution core, and to reserve a second number of entries in the plurality of storage locations for that execution core for use by individual ones of the respective plurality of hardware threads for that execution core; and
    tracking circuitry configured to maintain:
      a plurality of counter values, each of which corresponds to a respective one of the respective plurality of hardware threads for that execution core and indicates, for that counter value's respective hardware thread, how many of the second number of entries in the plurality of storage locations for that execution core are currently storing a random number available for use by only that respective hardware thread; and
      a first additional counter value that indicates how many of the first number of entries in the plurality of storage locations for that execution core are currently storing a random number available for use by any of the respective plurality of hardware threads for that execution core.

2. The processor of claim 1, wherein the arbitration circuitry of each of the plurality of execution cores is configured to use the plurality of storage locations for that execution core as a first-in first-out (FIFO) queue by dispensing random numbers from the local random number buffer for that execution core in the order in which they were received from the RNG; and
  wherein using the plurality of storage locations for that execution core as a FIFO queue includes dispensing a random number from a particular storage location that corresponds to a head of the FIFO queue, and wherein removing a random number from the particular storage location causes the arbitration circuitry for that execution core to decrement the first additional counter value associated with the first number of entries in the plurality of storage locations for that execution core or a second additional counter value associated with the second number of entries in the plurality of storage locations for that execution core.

3. The processor of claim 1, wherein the arbitration circuitry of each of the plurality of execution cores is configured to respond to requests for random numbers by depleting the first number of entries in the plurality of storage locations for that execution core before depleting the second number of entries in the plurality of storage locations for that execution core.

4. The processor of claim 1, wherein the arbitration circuitry of each of the plurality of execution cores is configured to respond to requests for random numbers by a given hardware thread by depleting a given portion of the second number of entries in the plurality of storage locations for that execution core before depleting the first number of entries in the plurality of storage locations for that execution core, wherein the given portion of the second number of entries in the plurality of storage locations for that execution core is reserved for exclusive use by the given hardware thread.

5. The processor of claim 1, wherein the arbitration circuitry for that execution core is configured to adjust the second number of entries in the plurality of storage locations for that execution core and the first number of entries in the plurality of storage locations for that execution core based on how many of the respective plurality of hardware threads for that execution core are active.

6. The processor of claim 1, wherein the arbitration circuitry for that execution core is configured to adjust the second number of entries in the plurality of storage locations for that execution core based on whether a given one of the respective plurality of hardware threads for that execution core has previously made a random number request within a particular period of time.

7. The processor of claim 1, wherein the arbitration circuitry for that execution core is configured to adjust a number of reserved entries in the second number of entries in the plurality of storage locations for that execution core for each of the respective plurality of hardware threads for that execution core based on information indicating which one of a plurality of random number allocation modes the local random number buffer for that execution core is operating in.

8. The processor of claim 1, wherein the arbitration circuitry for that execution core is configured to, in response to receiving a request for a random number from a particular one of the respective plurality of hardware threads for that execution core:
upon determining there are no available random numbers in the first number of entries in the plurality of storage locations for that execution core for use by any of the respective plurality of hardware threads for that execution core, and that there are no available random numbers in the second number of entries in the plurality of storage locations for that execution core for use by the particular hardware thread, wait until a later time to provide a random number in response to the request, rather than denying the request.

9. The processor of claim 1, wherein the arbitration circuitry for that execution core is configured to implement a plurality of modes for responding to requests for random numbers from the respective plurality of hardware threads for that execution core; and
wherein a first one of the plurality of modes includes denying a random number request access to the plurality of storage locations for that execution core when the plurality of storage locations for that execution core have less than a pre-determined amount of random numbers available for a given hardware thread and the random number request is not an oldest one for the given hardware thread.

10. The processor of claim 9, wherein the arbitration circuitry for that execution core is configured to, based on a particular random number request corresponding to a particular type of instruction, override the first one of the plurality of modes and access an entry in the plurality of storage locations for that execution core to provide a random number even when the plurality of storage locations for that execution core has less than the pre-determined amount of random numbers available for the given hardware thread and the particular random number request is not an oldest one for the given hardware thread.

11. A method, comprising:
storing, by a local random number buffer of a first one of a plurality of execution cores, a plurality of random numbers received from a central random number generator (RNG) in a plurality of storage locations,
wherein the local random number buffer includes arbitration circuitry configured to allow a first number of entries in the plurality of storage locations to be used by any of a plurality of hardware threads supported by the first one of the plurality of execution cores, and to reserve a second number of entries in the plurality of storage locations for use by individual ones of the plurality of hardware threads;
maintaining a plurality of counter values, each of which corresponds to a respective one of the plurality of hardware threads and indicates, for that counter value's respective hardware thread, how many of the second number of entries are currently storing a random number available for use by only that respective hardware thread;
receiving, by the local random number buffer, a request for a random number from a first one of the plurality of hardware threads supported by the first one of the plurality of execution cores;
based on the counter value corresponding to the first one of the plurality of hardware threads, the local random number buffer determining that there are no random numbers available for use by the first one of the plurality of hardware threads for the request; and
in response to the determining, the local random number buffer waiting until a later time to provide a random number in response to the request, rather than denying the request.

12. The method of claim 11, wherein the determining that there are no random numbers available for use by the first one of the plurality of hardware threads comprises determining that there are no random numbers available in the first number of entries and that there are no random numbers reserved for use by the first one of the plurality of hardware threads in the second number of entries.

13. The method of claim 11, wherein the plurality of execution cores are configured to execute instructions of a particular instruction set architecture (ISA), wherein the ISA includes a user-level instruction for requesting a random number; and
wherein the request for the random number from the first one of the plurality of hardware threads corresponds to an instance of the user-level instruction.

14. The method of claim 13, wherein the ISA includes instructions corresponding to a plurality of different privilege levels, and wherein the user-level instruction corresponds to a privilege level that is lower than at least one other of the plurality of different privilege levels.

15. An apparatus, comprising:
a processor configured to execute instructions of a particular instruction set architecture (ISA), wherein the ISA includes a user-level instruction that requires a random number;
wherein the processor comprises:
a plurality of execution cores, each of which is configured to execute a respective plurality of hardware threads; and
a central random number generator (RNG) configured to provide random numbers to the plurality of execution cores;
wherein each of the plurality of execution cores comprises:
a local random number buffer that includes a plurality of storage locations configured to store random numbers received from the RNG;
arbitration circuitry configured to access the plurality of storage locations in response to an instance of the user-level instruction being executed by a given one of the respective plurality of hardware threads for that execution core;
tracking circuitry configured to maintain a plurality of counter values, each of which corresponds to a respective one of the respective plurality of hardware threads for that execution core and indicates, for that counter value's respective hardware thread, how many of entries in the plurality of storage locations for that execution core are currently storing a random number available for use by only that respective hardware thread; and wherein each execution core is configured to, in response to an indication by the arbitration circuitry for that execution core that no random number is available for the instance of the user-level instruction, put the instance of the user-level instruction into a wait queue, wherein that execution core is configured to, in response to an indication by the arbitration circuitry for that execution core that a new random number stored in the plurality of storage locations for that execution core has become available for the instance, reactivate the instance from the wait queue and execute the instance by providing it with the new random number.

16. The apparatus of claim 15, wherein the indication that the new random number stored in the plurality of storage locations for that execution core has become available is based on the local random number buffer for that execution core receiving the new random number from the RNG.

17. The apparatus of claim 15, wherein the RNG is configured to avoid starvation by allocating new random numbers to different ones of the plurality of execution cores using one or more arbitration schemes.

18. The apparatus of claim 15, wherein the ISA includes instructions corresponding to a plurality of different privilege levels, and wherein the user-level instruction corresponds to a privilege level that is lower than at least one other of the plurality of different privilege levels.

19. The apparatus of claim 15, wherein the arbitration circuitry for each of the plurality of execution cores is configured to dynamically adjust a number of reserved entries in the plurality of storage locations of that execution core for each of the respective plurality of hardware threads for that execution core;

wherein the dynamically adjusting is based on at least one of:
  recency of consumption of a random number by each of the respective plurality of hardware threads for that execution core; or
  an indication that one of the respective plurality of hardware threads for that execution core has become active or inactive.

* * * * *